United States Patent [19]

Greskovich et al.

[11] Patent Number: 5,484,750

[45] Date of Patent: * Jan. 16, 1996

[54] TRANSPARENT POLYCRYSTALLINE GARNETS

[75] Inventors: Charles D. Greskovich; William P. Minnear, both of Schenectady; Chester R. O'Clair, Latham, all of N.Y.; Erdogan O. Gurmen, Shorewood; Robert J. Riedner, Waukesha, both of Wis.

[73] Assignee: General Electric Company, Schenectady, N.Y.

[*] Notice: The portion of the term of this patent subsequent to Jun. 7, 2011, has been disclaimed.

[21] Appl. No.: 288,660

[22] Filed: Aug. 10, 1994

Related U.S. Application Data

[63] Continuation of Ser. No. 547,006, Jun. 29, 1990, abandoned.

[51] Int. Cl.$^6$ .................. C04B 35/50; C04B 35/115; C04B 35/44

[52] U.S. Cl. .................. 501/86; 501/152; 501/153; 501/127; 501/132; 252/582; 252/301.4 F; 252/301.4 R

[58] Field of Search .................. 117/945, 937; 252/582, 301.47, 301.4 R; 501/86, 152, 127, 153, 132

[56] References Cited

U.S. PATENT DOCUMENTS

| | | | |
|---|---|---|---|
| 3,550,033 | 12/1970 | Ohlmann et al. | 331/94.5 |
| 3,767,745 | 10/1973 | Gazza et al. | 423/600 |
| 4,029,755 | 6/1977 | Gazza et al. | 423/600 |
| 4,350,558 | 9/1982 | Boudot et al. | 252/62.57 X |
| 4,350,559 | 9/1982 | Boudot et al. | 252/65.27 X |
| 4,525,628 | 1/1985 | DiBianca et al. | 252/301.4 R |
| 4,747,973 | 5/1988 | Cusano et al. | 252/301.4 R |
| 4,802,180 | 1/1989 | Brandle, Jr. et al. | 252/301.17 X |
| 4,980,320 | 12/1990 | Najjar et al. | 252/301.4 R |
| 4,987,575 | 1/1991 | Alfano et al. | 252/301.17 |
| 5,057,692 | 10/1991 | Greskovich et al. | 252/301.4 R X |
| 5,100,598 | 3/1992 | Dole et al. | 252/301.4 R X |
| 5,256,242 | 10/1993 | Imaeda et al. | 156/603 |
| 5,318,722 | 6/1994 | Tsoukala et al. | 252/301.4 R |

FOREIGN PATENT DOCUMENTS

| | | |
|---|---|---|
| 297269 | 1/1989 | European Pat. Off. . |
| 370824 | 5/1990 | European Pat. Off. . |
| 399665 | 11/1990 | European Pat. Off. . |
| 0030170 | 6/1981 | France .................. 501/86 |
| 88348486 | 6/1988 | Germany . |

OTHER PUBLICATIONS

W. D. Kingery, et al. *Introduction to Ceramics*, John Wiley and Sons; New York, 1960, pp. 646–678. No Month.

Sax, et al. *Hanley's Condensed Chemical Dictionery*, New York, 1987, pp. 549, 551. No Month.

O. V. Gorshkova et al., "A Dense Ceramic Based on Gadolinium–Gallium Garnet", Glass and Ceramics, vol. 39, No. 11, Nov. 1982, New York, pp. 609–612.

(List continued on next page.)

*Primary Examiner*—C. Melissa Bonner
*Attorney, Agent, or Firm*—Marvin Snyder

[57] ABSTRACT

Transparent, polycrystalline garnet bodies having desirable properties for use as laser material, luminescent x-ray scintillator materials and other uses are produced by mixing a chloride source solution of the desired cations with a basic ammonium solution to produce a precipitate having a substantially uniform composition which can be further processed to provide the desired transparent body. This precipitate is separated from the solution, dried, thermally decomposed at a temperature in the range from 700 to 1,000° C., pressed to form a compact, isostatically pressed at up to 60,000 psi to provide a green, unsintered compact having a density in the vicinity of 55% of theoretic density. That green compact is then sintered in oxygen at a temperature between 1,400 and 1,700° C. to produce the desired transparent body. Alternatively, the compact may be sintered in oxygen at temperatures in the range from about 1,400 to about 1,600° C. to a closed pore stage and then hot isostatically pressed at high pressure to provide the desired transparent body.

3 Claims, 6 Drawing Sheets

OTHER PUBLICATIONS

A. Overs et al., "Properties of the Solid Electrolyte Gadolinia–Doped Ceria Prepared by Thermal Decomposition of Mixed . . . Oxalate", Journal of the American Ceramic Society, vol. 65, No. 12, Dec. 1982, Columbus, Ohio, pp. 606–609.

V. P. Chalyi et al., "Conditions and Mechanism of Formation of Gadolinium and Ytterbium Gallate Garnet", Chemical Abstracts, vol. 95, Columbus, Ohio, Abstract No. 196458J, p. 658, 1981, No Month.

G. deWith et al., Materials Res. Bulletin, 19 1669–1674 (1984), *Translucent $Y_3Al_5O_{12}$ Ceramics*. No Month.

J. Nicolas et al., Solid State Chemistry, 52 101–113 (1984), *$Sm_2O_3$–$Ga_2O_2$ and $Gd_2O_3$–$Ga_2O_3$ Phase Diagrams*. No Month.

FIG. 2

1. FORM A SOURCE CATION SOLUTION (A)
2. FORM A PRECIPITATE-INDUCING SOLUTION (B)
3. COMBINE SOLUTIONS A & B TO FORM A PRECIPITATE
4. WASH THE PRECIPITATE
5. DRY THE PRECIPITATE
6. THERMALLY DECOMPOSE THE PRECIPITATE TO FORM PRIMARILY THE GARNET OXIDE PHASE
7. MILL THE OXIDE POWDER
8. PRESS THE POWDER TO FORM A COMPACT
9. SINTER THE COMPACT
10. HOT ISOSTATIC PRESS (HIP) THE SINTERED COMPACT
11. ANNEAL THE HIPed SAMPLE

TRANSPARENT POLYCRYSTALLINE GARNETS

This application is a continuation of application Ser. No. 07/547,006 filed Jun. 29, 1990, now abandoned.

RELATED APPLICATIONS

This application is related to application Ser. No. 07/547,007, now U.S. Pat. No. 5,057,692, entitled "High Speed, Radiation Tolerant, CT Scintillator System Employing Garnet Structure Scintillators" by C. D. Greskovich et al. and application Ser. No. 07/546,824, now abandoned, entitled "Hole-Trap-Compensated Scintillator Material", by V. G. Tsoukala et al., each of which is being filed concurrently herewith and is incorporated herein by reference in its entirety.

BACKGROUND OF THE INVENTION

1. Field of the Invention

The present invention relates to the field of ceramic materials, and more particularly, to the field of transparent ceramic materials. It also relates to the field of x-ray sensitive, solid luminescent scintillators suitable for use in high speed computed tomography (CT) scanning systems, particularly medical CT systems.

2. Background Information

A luminescent material absorbs energy in one portion of the electromagnetic spectrum and emits energy in another portion of the electromagnetic spectrum. A luminescent material in powder form is commonly called a phosphor, while a luminescent material in the form of a transparent solid body is commonly called a scintillator.

Most useful phosphors emit radiation in the visible portion of the spectrum in response to the absorption of the radiation which is outside the visible portion of the spectrum. Thus, the phosphor performs the function of converting electromagnetic radiation to which the human eye is not sensitive into electromagnetic radiation to which the human eye is sensitive. Most phosphors are responsive to more energetic portions of the electromagnetic spectrum than the visible portion of the spectrum. Thus, there are powder phosphors which are responsive to ultraviolet light (as in fluorescent lamps), electrons (as in cathode ray tubes) and x-rays (as in radiography).

Two broad classes of luminescent materials are recognized. These are self-activated luminescent materials and impurity-activated luminescent materials.

A self-activated luminescent material is one in which the pure crystalline host material upon absorption of a high energy photon elevates electrons to an excited state from which they return to a lower energy state by emitting a photon. Self-activated luminescent materials normally have a broad spectrum emission pattern because of the relatively wide range of energies which the electron may have in either the excited or the lower energy states with the result that any given excited electron may emit a fairly wide range of energy during its transition from its excited to its lower energy state, depending on the particular energies it has before and after its emissive transition.

An impurity activated luminescent material is normally one in which a non-luminescent host material has been modified by inclusion of an activator species which is present in the host material in a relatively low concentration such as in the range from about 200 parts per million (ppm) to about 1,000 ppm. However, some phosphors require several mole percent of activator ions for optimized light output. With an impurity activated luminescent material, the host crystal absorbs the incident photon and the absorbed energy may be accommodated by the activator ions or it may be transferred by the lattice to the activator ions. One or more electrons of the activator ions are raised to a more excited state. These electrons, in returning to their less excited state, emit a photon of luminescent light. In many commonly employed impurity activated luminescent materials, the electrons which emit the luminescent light are d or f shell electrons whose energy levels may be significantly affected or relatively unaffected, respectively, by the surrounding crystal field. In those situations where the activator ion is not much affected by the local crystal field, the emitted luminescent light is substantially characteristic of the activator ions rather than the host material and the luminescent spectrum comprises one or more relatively narrow emission peaks. This contrasts with a self-activated luminescent material's much broader emission spectrum. In those situations where the electron energies of the activator ions are significantly affected by the crystal structure, the luminescent spectrum is normally a fairly broad one similar to that of a self-activated luminescent material. The host material of an impurity activated luminescent material normally has many other uses in which no activating species is present. In some of those uses, that host material may include other species to modify its properties, and may even include constituents which are luminescent activators, but which are included in the composition because of non-luminescent characteristics which they impart to that composition.

There are a vast number of known phosphors each of which has its own set of properties such as the turn-on delay, efficiency, primary decay time, afterglow, hysteresis, luminescent spectrum, radiation damage and so forth. The turn-on delay of a luminescent material is the time period between the initial impingement of stimulating radiation on the luminescent material and the luminescent output reaching its maximum value, for a constant intensity of stimulating radiation. The efficiency of a luminescent material is the percentage of the energy of the absorbed stimulating radiation which is emitted as luminescent light. When the stimulating radiation is terminated, the luminescent output from a scintillator decreases in two stages. The first of these stages is a rapid decay from the full luminescent output to a low, but normally non-zero, value at which the slope of the decay changes to a substantially slower decay rate. This low intensity, normally long decay time luminescence, is known as afterglow and usually occurs with intensity values less than 2% of the full intensity value. The initial, rapid decay is known as the primary decay or primary speed and is measured from the time at which the stimulating radiation ceases to the time at which the luminescent output falls to 1/e of its full intensity value.

A luminescent material exhibits hysteresis if the amount of luminescent light output for a given amount of incident stimulating radiation depends upon the amount of stimulating radiation which has been recently absorbed by the luminescent material. The luminescent spectrum of a luminescent material is the spectral characteristics of the luminescent light which is emitted by that material.

Radiation damage is the characteristic of a luminescent material in which the quantity of light emitted by the luminescent material in response to a given intensity of stimulating radiation changes after the material has been exposed to a high radiation dose. Radiation damage may be measured by first stimulating a luminescent material with a known, standard or reference, intensity of radiation. The initial output ($I_o$) of the photodetector in response to this reference intensity of incident stimulating radiation is measured and recorded or stored. Next, the luminescent material is exposed to a high dosage of radiation. Finally, the luminescent material is immediately again exposed to the reference intensity of stimulating radiation and the final output ($I_f$) of its photodetector, in response to this reference intensity of stimulating radiation, is measured and stored or recorded. The radiation damage (RD) may then be expressed as:

$$RD = \frac{I_f - I_o}{I_o} \quad (1)$$

Ideally, the radiation damage should be as small as possible. In most luminescent materials, it is a negative number because $I_f$ is normally less than $I_o$. However, if the afterglow magnitude is $\geq 0.1\%$ at ~100 milliseconds after cessation of x-radiation, then unreliable and positive numbers for radiation damage may be obtained.

In phosphors for use in radiography, many of these characteristics can vary over a wide range without adversely affecting overall system performance. In other applications, each of these characteristics must be strictly specified to obtain maximum or practical performance.

In a computed tomography (CT) scanning system, an x-ray source and an x-ray detector array are positioned on opposite sides of the subject and rotated around the subject in fixed relation to each other. Early CT scanning systems employed xenon gas as their x-ray detection medium. In these systems, incident x-rays ionize the xenon gas and the resulting ions are attracted to charged plates at the edge of the cell and the scintillator output is a charge or current. More recently, CT scanners with solid scintillators have been introduced. In a solid scintillator system, the scintillator material of a cell or element absorbs x-rays incident on that cell and emits light which is collected by a photodetector for that cell. During data collection, each cell or element of the detector array provides an output signal representative of the present light intensity in that cell of the array. These output signals are processed to create an image of the subject in a manner which is well known in the CT scanner art. It is desirable for the luminescent material in a CT scanner to have a linear characteristic in which the light output is a linear function of the amount of stimulating radiation which is absorbed in order that light output may be directly converted to a corresponding intensity of stimulating radiation in a linear manner.

In systems such as CT scanners, the luminescent material must have many specialized characteristics which are not needed in many of the previously mentioned phosphor based systems. First, in x-ray based CT systems, it is desirable to absorb substantially all of the incident x-rays in the luminescent material in order to minimize the x-ray dose to which the patient must be exposed in order to obtain the computed tomography image. In order to collect substantially all of the incident x-rays, the luminescent material must have a thickness in the direction of x-ray travel which is sufficient to stop substantially all of the x-rays. This thickness depends both on the energy of the x-rays and on the x-ray stopping power of the luminescent material. Second, it is important that substantially all of the luminescent light be collected by the photosensitive detector in order to maximize overall system efficiency, the signal to noise ratio and the accuracy with which the quantity of incident stimulating radiation may be measured. In order to extract substantially all of the luminescent light generated in the luminescent material of the CT scanner, the luminescent material should be transparent to the luminescent light. Otherwise much of the luminescent light will not reach the photosensitive detector because of scattering and absorption within the luminescent material. Consequently, the luminescent material is provided in the form of a solid bar which is substantially transparent to the luminescent light and which is thick enough in the direction of x-ray travel to absorb substantially all of the incident x-rays. This complicates both the selection of a luminescent material for use in CT scanning and its preparation since many materials which are known to luminesce and which have been used or tested as powder phosphors cannot be provided in the form of a solid bar having the necessary transparency.

The luminescent properties of materials have not been tabulated in handbooks in the manner in which the melting point, boiling point, density and other more mundane physical characteristics of various compounds have been tabulated. Most luminescent data is found in articles with respect to particular materials which the authors have measured for one reason or another. Further, most characterization of luminescent materials has been done using ultraviolet (UV) light as the stimulating radiation because ultraviolet light is more easily produced than x-rays and is generally considered less harmful. Unfortunately, there are a number of materials which are luminescent in response to ultraviolet light stimulation which are not luminescent in response to x-ray stimulation. Consequently, for many materials, even that luminescent data which is available provides no assurance that the material will luminesce in response to x-ray stimulation. Further, for many applications of phosphors many of the parameters which must be closely controlled in a scintillator for use in a state-of-the-art CT scanning system are unimportant and thus have not been measured or reported. Consequently, existing luminescent material data provides little, if any, guidance in the search for a scintillator material appropriate for use in a state-of-the-art CT scanning system. Among the parameters on which data is generally unavailable are radiation damage in response to x-ray stimulation, afterglow, susceptibility to production in single crystalline form, hysteresis phenomena, mechanical quality and in many cases, even whether they are x-ray luminescent. The large number of parameters which must meet strict specifications in order for a given material to be suitable for use in a state-of-the-art CT scanner, including the ability to provide the material in the form of transparent scintillator bodies, makes the process of identifying a suitable scintillator material one which essentially begins from scratch and is akin to searching for "a needle in a haystack". The difficulty of identifying such a material is exemplified by the use of cadmium tungstate and cesium iodide activated with thallium in CT scanning machines presently being marketed despite the fact that each of these materials has a number of characteristics (discussed below) which are considered undesirable for a state-of-the-art CT scanner scintillator.

There are several reasons that it is desirable that the radiation damage be as small as possible. One disadvantage of high radiation damage is that as radiation damage accumulates, the sensitivity of the system decreases because of the progressively smaller quantity of light which is emitted by the scintillator material for a given stimulating dosage of radiation. Another disadvantage is that for too high a radiation damage, the scintillation detectors must eventually be replaced because of the cumulative effects of the radiation damage. This results in a substantial capital cost for the replacement of the scintillation detecting system. A more bothersome, and potentially even more expensive effect of high radiation damage is a need to recalibrate the system frequently during the working day, and potentially as frequently as after every patient. Such recalibration takes time and also exposes the scintillator material to additional radiation which contributes further damage. It is considered desirable that the radiation damage of a scintillator material for use in a CT scanning system be small enough that calibration of the system at the beginning of each working day is sufficient to ensure accurate results throughout the working day.

One way of providing the luminescent material in the form of a transparent bar is to employ a single crystalline luminescent material which is transparent to its own luminescent radiation. A common method of growing single crystals is the Czochralski growth technique in which appropriate source materials are placed in a high temperature crucible which is often made of iridium (Ir) and the crucible and its contents are heated to above the melting point of the desired single crystalline material. The resulting molten material is known as the melt. During growth, the melt temperature is held at a value at which the upper portion of the melt is cool enough for single crystalline material to grow on a seed crystal brought into contact with the melt, but not to spontaneously nucleate. A seed crystal of the desired material or one on which the desired material will grow as a single crystal is lowered into contact with the top of the melt. As the desired crystalline material grows on the seed crystal, the seed crystal is withdrawn (pulled upward) at a rate which maintains the growing boule of single crystalline material at a desired diameter. Typically, the seed crystal is rotated during growth to enhance the uniformity of the growing crystal. The source material which is initially placed in the crucible may take any appropriate form, but is normally a mixture of appropriate quantities of source materials which together provide a melt having the stoichiometry and impurity control desired for the single crystalline material to be grown.

When a pure crystal is grown from a corresponding melt, the Czochralski growth technique normally provides a high quality, uniform composition single crystal of the desired composition. When it is desired to produce a crystal having substitutions for some portion of the atoms of the pure crystalline material, the growth dynamics are more complex and the manner in which the substituent enters into the crystal structure and thus its concentration in the melt and boule as functions of time depend on a number of characteristics. One of the effects of these characteristics is characterized as the segregation coefficient. The segregation coefficient has a value of 1 when the substituent is normally present in the solid boule in the same ratio as it is present in the source melt. The segregation coefficient is greater than 1 when the substituent is normally present in the solid boule in greater concentration than it is present in the source melt and the segregation coefficient is less than 1 when the substituent is normally present in the solid boule in lesser concentrations than it is present in the melt. While there are a number of different fundamental reasons for these differences, the segregation coefficient is an effective means of expressing the result.

Where slabs or bars of the single crystalline material are desired, the Czochralski-grown single crystalline boule is sliced into wafers and then into bars of the desired configuration. The only two single crystalline luminescent materials known to be in use in commercial CT scanning systems are cesium iodide (CsI) and cadmium tungstate ($CdWO_4$). The cesium iodide is thallium (Tl) activated while the cadmium tungstate is a pure, self-activated luminescent material. CsI produces a luminescence output having a peak emission at about 550 nm and exhibits appreciable hysteresis and radiation damage. $CdWO_4$ produces a luminescence output having a peak at about 540 nm and exhibits high radiation damage, although to a lesser extent than CsI. The radiation damage with CsI is severe enough, that recalibration of the system between patients is often desirable. While the radiation damage in $CdWO_4$ is less than that, recalibration more than once a day is considered desirable. As a consequence of these radiation damage characteristics, systems which employ either of these materials as their scintillating material suffer from a decrease in sensitivity as radiation damage accumulates and must eventually have their scintillator system replaced.

In a CT scanning system, one of the crucial characteristics of a scintillator bar is its Z-axis response curves. Individual scintillator bars are normally narrow for maximum resolution and deeper than wide to provide adequate x-ray stopping power and relatively long perpendicular to the plane of the x-ray beam/scintillator system in order to collect sufficient x-rays to be efficient. The Z-axis characteristic is the photodetector output in response to a constant intensity, narrow, x-ray stimulating beam as that beam is scanned from one Z-direction end of the scintillator bar to the other. Ideally, this characteristic is symmetric about the longitudinal center of the scintillator bar and increases monotonically from each end to the center. The increase in output near the ends of the bar is preferably complete once the entire Z-direction thickness of the beam is disposed on the scintillator bar, with the output being substantially uniform along the intervening portion of the bar.

In order to meet these Z-axis requirements, the scintillator bar must have substantially uniform optical, luminescent and source radiation absorption properties along its entire length. For single crystal, impurity-activated scintillator bars, this requires the ability to grow source boules having uniform luminescent activator concentration both radially and lengthwise of the boule, since the luminescent output is dependent on the local concentration of the activator ion. Consequently, the process of selecting a scintillator material for a CT scanner, in addition to determining all of the other important properties of the material, must also include establishing the feasibility of producing scintillator bars with acceptable Z-axis characteristics.

In a CT scanner, it is preferable to provide a reflective surface on all surfaces of the scintillator bar other than the surface along which the photodetector diode is disposed. Thus, a typical solid scintillation detector system comprises a plurality of individual scintillator bars positioned side-by-side with an individual photodetector diode coupled to each scintillator bar to convert its luminescent light into a corresponding electrical signal. It is important in such a system that all of the scintillator bars have similar overall conversion efficiencies (that is, substantially identical electrical output signals for identical incident x-ray radiation). This places another limitation on the selection of the scintillator material in that it must be possible to produce a sufficient quantity of scintillator bars having similar characteristics to assemble a scintillation detector having as many as 1,000 or more elements.

The primary decay time determines how fast a CT scanner can scan a patient since it is necessary for the luminescent output in response to radiation incident in one position of the scanner to have ceased before the luminescent output at another position of the scanner can be accurately measured. At present, a primary decay time of less than 500 microseconds is preferred, with still lower values being more desirable if they can be obtained without undesirable affects on other properties of the scintillator material such as maximum light output, radiation damage and hysteresis. It is also desirable that the maximum afterglow level be very small and that it decay relatively rapidly. For modern CT scanners, afterglow may be measured at 100 to 150 milliseconds after stimulating radiation termination and again at 300 milliseconds to characterize a scintillator material. An afterglow of less than 0.1% is considered highly desirable since the photodetector cannot distinguish between luminescent light which is a result of afterglow from earlier stimulation and luminescent light which is a result of present stimulation. Thus, afterglow can limit the intensity resolution of a CT scanner system.

For purposes of comparing the efficiency of different candidate scintillator materials, it is convenient to normalize light output. The amplitude of the output signal from a photodetector diode in response to stimulation of a standard sized scintillator bar of the candidate material with an established reference intensity of x-rays is compared with the output produced by cadmium tungstate of the same configuration in response to the same stimulation. Cadmium tungstate is a convenient standard because the self-activated nature of its luminescence results in substantially fixed light output for a given intensity of stimulating radiation so long as it has not been heavily radiation damaged, since its light output does not depend on the concentration of an activator. Thus, light output data taken by different individuals and at different times can be directly compared without having to first establish the calibration of different test setups.

It is desirable to have computed tomography scanning systems operate as fast as possible to maximize the number of patients which can be examined by a computed tomography scanner each working day and because the shorter time a scan takes, the easier it is for a patient to hold still during the scan. Further, the movement of internal organs is minimized.

As the scanning speed of a CT system is increased, the signal amplitude decreases for a fixed x-ray dose rate. Consequently, the signal-to-noise ratio, the contrast and thus the useful intensity resolution will decrease unless system parameters are adjusted to reduce noise. In order to reduce noise, the primary decay time of the scintillator should be reduced to a value where it does not contribute noise to the system. The afterglow should also be reduced as much as possible, since it provides a background luminescence intensity which is a noise contribution to the photodetector output. Selecting a scintillator material having its peak output in the vicinity of the peak sensitivity of the photodetector has the effect of reducing noise by increasing signal amplitude. Other modifications can also assist in maintaining the signal-to-noise ratio.

As the CT scanner field has matured, the speed of the electronics has increased, thus making faster scintillators desirable in order that a data scan may be performed in less time. It is now desired to operate CT scanning systems at speeds which require scintillators which are much faster than what was required as little as five years ago. Consequently, there is a vast lack of data about known solid luminescent materials which would be needed in order to select and make a scintillator material which is appropriate for use in a state-of-the-art CT scanning system where high speed electronics must be matched by a still higher speed scintillation material.

Separate from the problem of determining all these characteristics for individual candidate materials, is the problem that in a scintillation scanner, material must be provided in the form of a transparent solid body. Many luminescent materials which can be provided in powder form cannot be provided in a single crystalline form and thus are not available as transparent bodies. This inability to produce particular luminescent materials as single crystalline material can be a result of incompatibility of crystal structures, instability at Czochralski growth temperatures, low solubility of some components of a luminescent material in the crystal structure or the melt, a segregation coefficient which results in a non-uniform distribution within the boule of the additives and/or substituents or other reasons. Consequently, even if a particular luminescent composition is identified as apparently having desirable properties for use in a scintillation detector of a computed tomography machine, production of such a scintillator detector is not straightforward. In many cases, the desired composition cannot be produced as a single crystalline material.

Scintillation counters are used to count high energy particles, in physics research. These scintillation counters normally comprise a solid transparent body (often a plastic with a luminescent material dispersed in it) which is coupled to a photomultiplier tube to detect the very faint luminescence produced by absorption of a single particle. The materials used for such scintillation counters must have a very short primary decay time (preferably much less than 100 nanoseconds) in order to distinguish separate, but closely spaced-in-time events from each other in order that the desired counting may take place. The other characteristics which are important to the use of a material as the scintillator in a CT scanning system are of little consequence in the scintillation counter art so long as the afterglow is low enough that a new primary scintillation can be distinguished from any background afterglow resulting from previous events. These scintillation counters can use luminescent materials whose afterglow would present a problem in the CT scanning art. Consequently, although work has been done on scintillation materials for use in scintillation counting applications, such work is only peripherally relevant to a search for a scintillation material for use in a CT scanning system.

There are a number of luminescent materials which can be produced by flux growth techniques as small single crystals, but which cannot be produced as large single crystals because they are unstable at high temperatures and decompose into constituent materials. Other luminescent materials have been produced as thin films in attempts to develop phosphors for projection cathode ray tubes in order to minimize light loss due to scattering in amorphous or polycrystalline films. Such materials have no utility for the scintillators of CT scanners in the absence of an ability to provide a transparent body having sufficient thickness (generally at least 1 mm thick) for the material to be effective at stopping the x-rays employed in a CT scanning system. Further, the reports of the development work done on these materials contain no data on many characteristics which are crucial to determining whether a material is suitable for use in a CT scanning system.

A polycrystalline alternative to the single crystalline scintillator materials cesium iodide and cadmium tungstate is disclosed in U.S. Pat. Nos. 4,421,671; 4,466,929; 4,466,930; 4,473,413; 4,518,545; 4,518,546; 4,525,628; 4,571,312; 4,747,973 and 4,783,596. The scintillator composition disclosed in these patents is a cubic yttrium gadolinium oxide doped with various rare earth elements to provide a scintillator material having desired luminescent properties. These materials have not been prepared in single crystalline form because of the difficulty of growing crystals with desired, uniform distribution of all of the necessary constituents. As is further disclosed in the above recited patents, a method was developed for providing this doped yttrium-gadolinium oxide scintillator material in a polycrystalline ceramic form in which it is sufficiently transparent to provide an excellent scintillator material. This material has the substantial advantage over the cesium iodide and cadmium tungstate of being essentially free of radiation damage and hysteresis as well as having a sufficiently low afterglow to satisfy the requirements for a high quality CT scanning system. Unfortunately, this material has a primary decay time on the order of 1,000 microseconds and thus is not as fast as is desired for present state-of-the-art CT scanning systems.

German patent DE 37 04 813 A1 describes a single crystal $Gd_{3-x}Ce_xAl_{5-y}Sc_yO_{12}$ scintillator prepared either by first spray drying a source sulphate solution and calcining the dried sulphate or mixing oxides—each followed by pressing, sintering, melting and pulling a single crystal in a high vacuum. A spectrum for the luminescent output from this material is also presented with its peak in the vicinity of 560 nm.

It would be desirable to have a scintillator which is fast, has a low afterglow, no hysteresis, no non-linearity in output, high x-ray stopping power, high light output for a given stimulating x-ray input and which emits light at a frequency where photodetector diodes are particularly sensitive.

Single crystalline yttrium aluminum garnet (YAG) doped with neodymium is a known laser material. This material has also been further doped with chromium to increase the absorbence of the light frequency used to optically pump a YAG laser. While attempts have been made to produce transparent polycrystalline YAG, such attempts have not been successful. Reduced opacity or increased translucency or transparency has been reported in sintered YAG where magnesium oxide or silicon dioxide was included in the composition in a concentration of 500–2,000 ppm. However, even with this addition, true transparency is not obtained. Further, the inclusion of such transparency promoters in a scintillator material would be expected to be undesirable because of the potential for these impurities to adversely effect one or more of the desirable properties of a scintillator material.

Many garnets are transparent in the infrared region. Consequently, transparent ceramic garnets would be desirable for use as combined visible/infrared windows where true transparency was obtained throughout this portion of the spectrum.

OBJECTS OF THE INVENTION

Accordingly, a primary object of the present invention is to provide a CT scintillator detection system with a polycrystalline, transparent scintillator which has a short primary decay time, has a low afterglow and has acceptable hysteresis, radiation damage and non-linearity in response to x-ray stimulation.

Another object of the present invention is to provide a CT scintillator detector with improved polycrystalline scintillator material.

Still another object of the present invention is to provide a long life polycrystalline CT scintillator detector system which can operate at higher scanning speeds than existing systems without radiation damage and other undesirable characteristics.

A further object of the present invention is to provide a polycrystalline CT scintillation detector having the desirable properties of high speed, high output, high x-ray stopping power combined with low values of the undesirable properties of afterglow, hysteresis, non-linearity and radiation damage susceptibility.

A still further object of the present invention is to provide transparent polycrystalline garnet ceramics having a controllable composition including partial substitution for cations of a basic garnet composition.

A still further object of the present invention is to provide such structures in which the basic garnet is a gadolinium garnet.

An additional object of the present invention is to provide transparent polycrystalline garnets suitable for use as the active medium of lasers.

SUMMARY OF THE INVENTION

Accordingly, the above and other objects which will become apparent from the specification as a whole, including the drawings, are accomplished by provision of cubic, polycrystalline, ceramic garnet materials having a density of at least 99.9% of theoretical density. These materials comprise a host garnet activated for x-ray or photoluminescence with appropriate ions which may include chromium, cerium, neodymium and other cations including mixtures of cations. In particular, those polycrystalline garnet compositions having more than one activator cation present at low concentrations are particularly desirable since such compositions are exceedingly difficult or impossible to produce in single crystalline form because of an inability to grow crystals having a uniform distribution of the various substituents throughout a single crystalline boule.

The host garnets for these materials may be three element (two cation) garnets such as gadolinium gallium garnet ($Gd_3Ga_5O_{12}$) or yttrium aluminum garnet ($Y_3Al_5O_{12}$), for example, or may comprise more that three elements such as gadolinium scandium gallium garnet ($Gd_3Sc_2Ga_3O_{12}$) or gadolinium scandium aluminum garnet ($Gd_3Sc_2Al_3O_{12}$) for example.

Such transparent polycrystalline garnet materials may be produced by a number of different methods. These include forming a chloride solution of the desired cations in appropriate relative concentrations, inducing formation of a substantially uniform composition precipitate by mixing this chloride solution with another appropriate solution such as ammonium oxalate or ammonium hydroxide. The precipitate is separated from the solution by filtering, centrifuging or other appropriate processes, dried and then heated to a thermal decomposition temperature typically in the range from 600° C. to 1,000° C. to produce a powder having the desired garnet composition. The resulting powder is then preferably milled and screened to eliminate particle agglomeration and to ensure that the majority of the particles used in the subsequent process are less than 10 microns in diameter.

This dried, fine powder is then pressed to form a compact in the desired configuration. Thereafter, the compact is sintered to about >99.9% of theoretical density, or alternatively, sintered to a closed pore stage and then hot isostatic pressed to still higher density. Upon polishing, the resulting ceramic body is transparent.

In particular, gadolinium gallium garnet ($Gd_3Ga_5O_{12}$), gadolinium scandium gallium garnet ($Gd_3Sc_2Ga_3O_{12}$), gadolinium scandium aluminum garnet ($Gd_3Sc_2Al_3O_{12}$), each activated with chromium 3+ ions in a concentrations from about 0.07 to 1.2 wt. % $Cr_2O_3$, yttrium aluminum garnet ($Y_3Al_5O_{12}$) activated with cerium 3+ ions at a concentration of about 0.33 wt. % $Ce_2O_3$ or neodymium 3+ ions at a concentration of about 0.85 wt. % $Nd_2O_3$ are particular examples of scintillator compositions which can provide the benefits of high speed, high output, low afterglow, high x-ray stopping power, emission of light in the sensitive portion of a photodetector diode's characteristics and acceptable hysteresis, non-linearity and minimal radiation damage. Other garnet host compositions and other activators may also be employed. For simplicity, we shall denote $Gd_3Ga_5O_{12}$ as GGG, $Gd_3Sc_2Ga_3O_{12}$ as GSGG, $Gd_3Sc_2Al_3O_{12}$ as GSAG and $Y_3Al_5O_{12}$ as YAG.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates a sequence of processing steps for forming a transparent, polycrystalline garnet body in accordance with the present invention;

DETAILED DESCRIPTION

Figure 1:
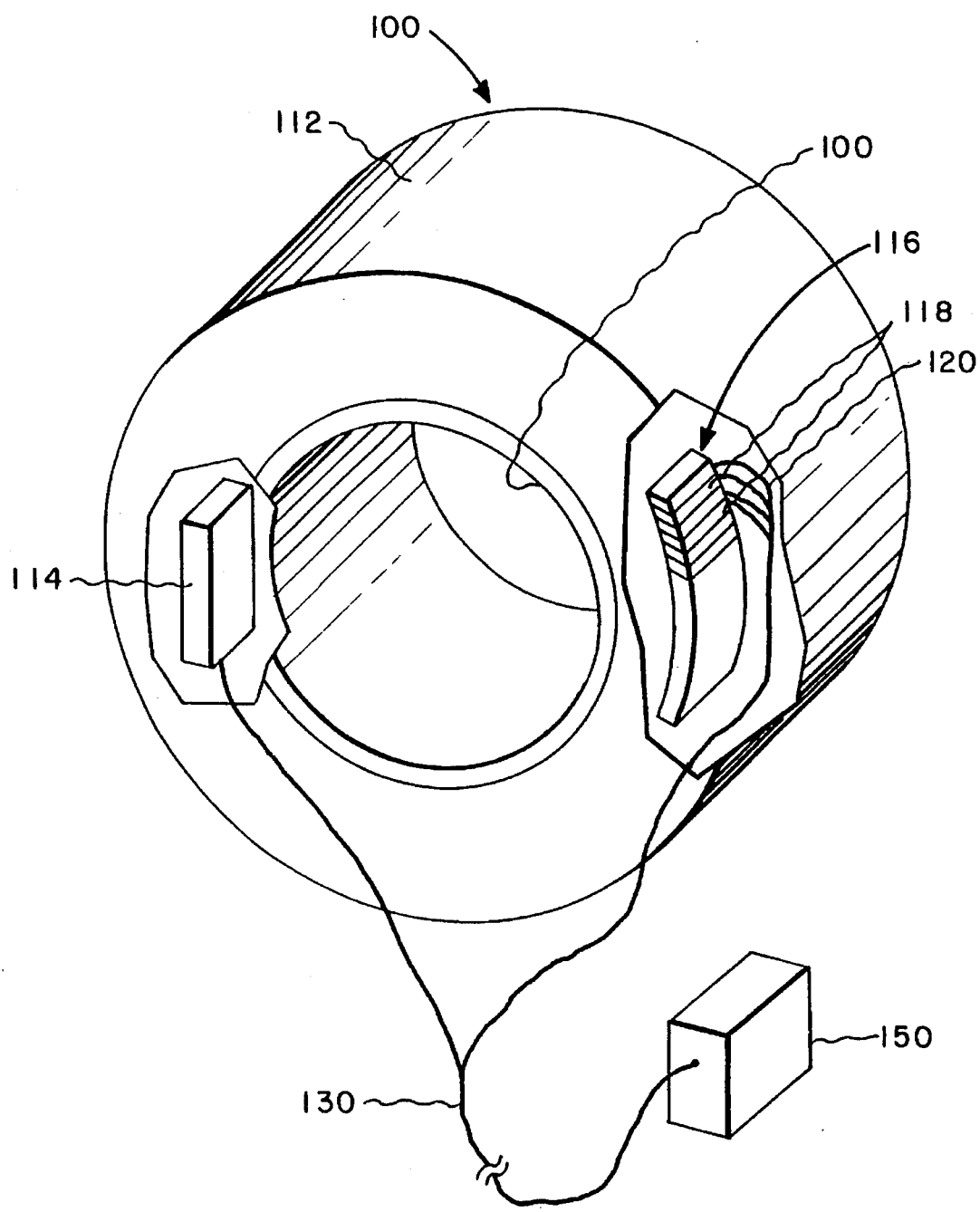
FIG. 1 is a schematic illustration of a CT scanning system.

A computed tomography (CT) scanning system 100 is illustrated schematically in FIG. 1. This CT scanning system 100 comprises a cylindrical enclosure 110 in which the patient or object to be scanned is positioned. A gantry 112 surrounds the cylinder 110 and is configured for rotation about the cylinder's axis. The gantry 112 may be designed to revolve for one full revolution and then return or may be designed for continuous rotation, depending on the system used to connect the electronics on the gantry to the rest of the system. The electronics on the gantry include an x-ray source 114 which preferably produces a fan x-ray beam which encompasses a scintillation detector system 116 mounted on the gantry on the opposite side of the cylinder 110. The fan pattern of the x-ray source is disposed in the plane defined by the x-ray source and the scintillation detector system 116. The scintillation detector system 116 is very narrow or thin in the direction perpendicular to the plane of the x-ray fan beam. Each cell 118 of the scintillation detector system incorporates a solid transparent bar of scintillator material and a photodetector diode optically coupled to that scintillator bar. The output from each photodetector diode is connected to an operational amplifier which is mounted on the gantry. The output from each operational amplifier is connected either by individual wires 120 or by other electronics to the main control system 150 for the computed tomography system. In the illustrated embodiment, power for the x-ray source and signals from the scintillation detector are carried to the main control system 150 by a cable 130. The use of the cable 130 generally limits the gantry to a single full revolution before returning to its original position. Alternatively, slip rings or optical or radio transmission may be used to connect the gantry electronics to the main control system 150 where continuous rotation of the gantry is desired. In CT scanning systems of this type, the scintillator material is used to convert incident x-rays to luminescent light which is detected by the photodetector diode and thereby converted to an electrical signal as a means of converting the incident x-rays to electrical signals which may be processed for image extraction and other purposes. At present, one of the limitations on the capabilities of such systems is the characteristics of the scintillator compositions, whether they be xenon gas or bars of solid scintillator material.

We have identified a class of luminescent materials which are appropriate for use as scintillators in high speed x-ray CT scanning systems of the type illustrated in FIG. 1. In particular, they luminesce in response to x-ray stimulation, have primary decay times of less than 500 microseconds, have afterglow levels of less than 0.2% at 100 to 300 milliseconds after the cessation of x-ray stimulating radiation, exhibit radiation damage having a magnitude of less than 5% after an exposure to between 500 and 1,000 rads of x-rays, exhibit essentially no hysteresis and when grown as single crystals by the Czochralski technique, are reasonably transparent to their luminescent light and typically have light outputs which range from about 100% to about 350% of that produced by cadmium tungstate single crystal, a material used in commercial x-ray body scanners.

This class of scintillator material is based on activated luminescence of cubic garnet crystals. Garnets are a class of materials with the crystal chemical formula $A_3B_5O_{12}$ in which the A cations are eight-coordinated with oxygens and the B cations are either octahedrally (six) or tetrahedrally (four) coordinated with oxygens. The crystal structure is cubic with 160 ions per unit cell containing eight formula units. In accordance with the present invention, the A cations are rare earth or yttrium ions alone, in combinations and/or with activator substitutions. The B cations may be rare earth ions or other ions, again, alone, in combinations and/or with substitutions. In particular, we have found that with activator ions substituted in the eight-coordinated or six-coordinated sites, these garnets are luminescent in response to x-ray stimulation. A particularly important activator ion which we have discovered is x-ray luminescent in this host material is the chromium 3+ ion located in six-coordinated sites.

The luminescent properties of the $Cr^{3+}$ in garnet host materials are characteristic of the $Cr^{3+}$ ion in lattice sites where the crystal field is relatively weak—that is, those host garnets which have a green cast to them when chromium is added, as opposed to those which has a red cast (in which the chromium ion is disposed in a relatively strong crystal field).

Examples of single crystalline garnet materials of this type are presented in the related application Ser. No. 07/547, 007, now U.S. Pat. No. 5,057,642, entitled "High Speed, Radiation Tolerant, CT Scintillator System Employing Garnet Structure Scintillators". As is detailed therein, the single crystalline boules of most of those materials had an activator concentration which varied along the length of the boule, and in many cases, with position across a wafer sliced from the boule. Problems were also encountered with the single crystalline boules developing cracks running generally lengthwise thereof. Thus, although the single crystalline materials in those examples have characteristics which make them suitable for use as the luminescent scintillator in CT scanning machines, the fabrication of scintillation detector systems from those materials can be difficult and can involve the production of a lot of material which turns out to be unusable.

A further problem with the use of single crystal gadolinium gallium garnet (GGG) is the tendency of pure GGG to grow in a spiral pattern. Such growth is undesirable for many uses and particularly where uniform scintillator bars are desired. A known technique for preventing such spiral growth is to add to the melt several tens of parts per million of calcium oxide (CaO), the calcium ion being in a 2+ oxidation state ($Ca^{+2}$). However, for scintillator use, this has the undesirable effect of adding an additional cation to the GGG crystal (and in particular one which is not in a 3+ oxidation state) which may have undesirable effects on one or more of the scintillator properties which are crucial for state-of-the-art CT scanner use of a solid scintillator.

In accordance with the present invention, the compositional control and uniformity is substantially increased and the quantity of unusable material is substantially reduced by forming the transparent, activated garnet scintillator bars of polycrystalline material. The polycrystalline process allows accurate control of the concentration of a number of substituents, as may be desired, and allows formation of arbitrary body shapes, as may be desired. We have developed several ways of producing such scintillator bars.

In these processes, we start by forming a hydrochloric acid solution of the desired cations in appropriate quantities. By appropriate quantities, we mean relative concentrations which result in the final transparent body containing the desired relative proportions of cations. Thus, in those situations where cations are present in the same relative concentrations in the final transparent body as they are in the hydrochloric acid solution of the source cations, it is that relative concentration which is desired in the hydrochloric acid solution. In those situations, where the quantity of one or more cations decreases relative to the quantity of other cations during the process of converting the source hydrochloric acid solution into the final transparent polycrystalline body, then appropriate quantities in the hydrochloric acid starting solution are those quantities which result in the final transparent garnet body having the desired composition.

The source compounds are preferably 99.99% or higher purity in order to minimize the unknown/uncontrolled impurities present in the final composition which can effect radiation damage, afterglow and luminescent efficiency.

One way of forming this source chloride solution is by dissolving the source cations in the form of oxides in hot concentrated hydrochloric acid. For those situations where a closely controlled final garnet composition is desired, especially where the absence of impurities is considered desirable, use of source compounds which are of 99.99% or higher purity is preferred. Naturally, the source cations may be provided as chlorides rather than oxides, if desired. Other source compounds may also be used. Once the source materials have completely dissolved in the hot concentrated hydrochloric acid, the resulting solution is cooled to room temperature. The resulting solution should be clear and free of precipitates or settling out of any of the source material. In the event that precipitation or settling out of source material occurs, the solution should be reheated, and additional hydrochloric acid added to the solution so that upon cooling to room temperature again, no precipitation or settling out occurs. That is, enough hydrochloric acid should be used to ensure that the source materials are not present at or above their solubility limit at room temperature.

Separately, an ammonium oxalate $(NH_4)_2C_2O_4$ solution is formed by dissolving ammonium oxalate or individual amounts of ammonia and oxalic acid. Enough ammonium oxalate should be prepared to ensure complete reaction with the cation-containing chloride solution. This ammonium oxalate solution should have a pH between about 7.5 and about 9.5. It is considered preferable that the pH of this ammonium oxalate solution be between 8.0 and 8.5.

When making small batches, we dripped the chloride cation source solution into this ammonium oxalate solution while the ammonium oxalate solution was being stirred. A white precipitate formed instantly upon contact between the two solutions. The inclusion of a magnetic stirring rod in the mixing container is a preferred method of mixing these solutions where small quantities are being prepared. Once all of the chloride source solution has been added to the ammonium oxalate solution, the precipitate formation is complete. Since our work was directed to preparing these materials for evaluation, we dripped the chloride cation source solution into the ammonium oxalate solution rather than just pouring the two together in order to ensure that no chemical inhomogeneity or separation of phases occurred during our preparation process. This dripping was accomplished at a rapid drip rate which was near streamlike.

During the process of adding the chloride source solution to the ammonium oxalate solution, the pH of the oxalate solution is preferably monitored with a pH meter and maintained at a pH between 8.0 and 8.5 by addition of ammonium hydroxide to the solution as required.

During the precipitation step, the precipitate forms in small enough particles that initially, a colloidal suspension of the precipitate in the oxalate solution is present. Following the completion of the precipitation step, this colloidal suspension will slowly settle out to leave a white precipitate at the bottom of the container and a clear solution above it. This settling process can be accelerated by filtering and/or centrifuging the precipitate-containing liquid.

If desired, the precipitate may be water and/or alcohol washed before separating the precipitate from the liquid. This is done by allowing the precipitate to settle, pouring off or otherwise removing most of the liquid and adding the wash water or alcohol, allowing the precipitate to settle again, and again removing the clear liquid. Where high purity and/or closely controlled composition of the final transparent garnet is desired, the wash water should be high purity, deionized water and the alcohol should be of standard reagent grade purity. This washing process removes excess ammonium oxalate and reaction products such as ammonium chloride from the precipitate. The precipitate is then separated from the wash solution by filtering, centrifuging or other appropriate techniques. This precipitate is a multi-component precipitate having a substantially uniform chemical composition. This wet precipitate is at present believed to be a complex of ammonium gadolinium-gallium oxalate (when preparing GGG), however, the detailed chemical compound composition or structure of this precipitate does not need to be known for the success of this process. This precipitate is preferably dried, such as by oven drying at a temperature of approximately 110° C. for a day or by vacuum drying.

X-ray diffraction analysis of this dried precipitate prepared from source materials $CrCl_3 \cdot 6H_2O$, $Gd_2O_3$ and $Ga_2O_3$ contains a number of x-ray peaks corresponding to $NH_4Gd(C_2O_4)_2 \cdot H_2O$ (an ammonium gadolinium oxalate complex). This dried precipitate is then heated in air to a temperature of about 750° C. to thermally decompose it.

We have found several different results of this decomposition when preparing a gadolinium garnet doped with small quantities of other cations such as $Cr^{3+}$, $Ce^{3+}$ or $Nd^{3+}$. In some cases, the resulting powder was substantially gadolinium garnet which was accompanied by minor amounts of the β-$Ga_2O_3$ and C-$Gd_2O_3$ phases. Frequently, only the garnet phase was observed. This was particularly true where the decomposition was carried out at 900° C. in air. When pure GGG was formed, the resulting powder was white. Where small amounts of $Cr^{3+}$ ions were included in the composition, the resulting powder was light green in color.

The specific surface area of the GGG:Cr powders formed at decomposition temperatures of 800° to 1,000° C. were measured by the BET nitrogen absorption method and ranged between about 5 and 15 $m^2g^{-1}$ which correspond, respectively, to a equivalent spherical diameters of 0.17 to 0.06 microns. The particle size distributions measured by the x-ray sedigraph method revealed that powder particles had sizes ranging between about 0.15 and 20 microns, suggesting that the as-thermally-decomposed garnet powders are appreciably agglomerated. If these powders are die or isostatically pressed at pressures up to 60,000 psi to form powder compacts for sintering with relative densities of up to about 55% and the compacts are sintered at temperatures of 1,500° to 1,650° C. in oxygen, the resulting ceramic body is typically opaque to translucent with relatively high amounts of residual porosity located within the garnet grains of the microstructure.

This powder may be directly pressed to produce a compact for sintering. However, it is preferred to first mill this powder either in a ball mill using zirconia grinding media and a liquid vehicle such as methyl or isopropyl alcohol. Ball milling times from about 4 to 24 hours are effective. Alternatively, fluid energy milling or jet milling may be used with pressure settings of from about 60 to about 100 psi.

The particle size distribution of these milled powders ranged between about 0.1 and 2 microns which indicates that agglomerates of the powder after the milling are much smaller than they were in the unmilled powder. Powder compacts pressed from this milled powder can be sintered to full theoretical density at temperatures between 1,400° and 1,600° C. in oxygen. Higher temperatures may also be used, if desired. The transparent, sintered GGG:Cr samples range in color from light green for low levels of chromium (0.001 mole fraction $Cr_2O_3$) in the composition to dark green for 0.003 mole fraction $Cr_2O_3$ and higher chromium concentrations.

The highest optical transparency garnet ceramics are produced by a method involving sintering the pressed compact at temperatures ranging from 1,400° C. to 1,525° C. for 1 to 3 hours in oxygen. After the compacts have been sintered to densities between about 95% and 98% of theoretical density and to the closed pore stage, they were hot isostatic pressed. The hot isostatic pressing was done by loading the sintered compacts into a molybdenum crucible and packing them with $Gd_2O_3$ powder to prevent possible contamination from the atmosphere inside the hot isostatic pressing (HIP) furnace. These samples were then hot isostatic pressed at 5,000 to 25,000 psi in argon gas at temperatures of about 1,350° C. to 1,600° C. for soak times 15 to 60 minutes at the maximum temperature. Following the hot isostatic pressing, the ceramic bodies typically have a thin, white surface coating. This surface coating is removed by light mechanical grinding. After cleaning in this manner, the samples typically have a darker green color than that observed with the sintered only samples. This difference in color appears to be related either to the different oxygen partial pressures prevailing in the sintering furnace ($P_{o2}$~1 atm) and the HIP furnace ($P_{o2} \leq 10^{-6}$ atm) or possibly, to the lower porosity of the HIP bodies since porosity tends to lend a white hue to the body.

The microstructures of polished and chemically etched sections of sintered and sinter/HIP GGG:Cr ceramics derived from milled powders are found to be much more uniform in residual pore distribution and grain size distribution than is the case with similar bodies formed from unmilled powders.

EXAMPLE 1

A desired composition $Gd_3Ga_{4.984}Cr_{0.016}O_{12}$ was prepared by dissolving 10.75 g of $Gd_2O_3$, 10.06 g $Ga_2O_3$ and 0.084 g $CrCl_3 \cdot 6H_2O$ (equivalent to 0.024 g $Cr_2O_3$) in 60 g of concentrated HCl. This amount of $Ga_2O_3$ represents a 9% excess above the amount of $Ga_2O_3$ desired in the final composition. This is to help to compensate for gallium loss during the precipitation/washing steps of our process.

When $Cr^{3+}$ is substituted in the GGG, it substitutes for $Ga^{3+}$ in the lattice because of their almost identical ~0.62 Å ionic radii. Thus, when $Cr^{3+}$ is the only substituent, the formula may be written $Gd_3Ga_{5-Y}Cr_YO_{12}$, where Y represents the number of moles of $Cr^{3+}$ in a mole of the garnet.

A separate solution of ammonium oxalate was prepared by dissolving 46.2 g of oxalic acid in 500 ml of deionized water and adding 125 ml of ammonium hydroxide solution (equal parts $NH_4OH$ and deionized water) to raise the pH to 8.35. The Gd-Ga-Cr chloride solution was dripped into the ammonium oxalate solution while controlling the pH between 8.33 and 8.35 via simultaneous addition of $NH_4OH$ while stirring the ammonium oxalate solution. A white precipitate formed immediately upon the beginning of the addition of the chloride solution, but remained in suspension as a result of its small particle size and the stirring of the ammonium oxalate solution. Stirring was continued for 10 minutes after the completion of the addition of the chloride solution. The solution was then centrifuged in a filtering centrifuge and washed with 600 ml of methyl alcohol having a pH of about 6.6.

This precipitate was dried for about 16 hours at 105° C. in flowing air and then heated in air to about 900° C. for one hour to thermally decompose it. A light green powder resulted. The powder was identified as a gadolinium gallium garnet phase plus a trace amount of β-$Ga_2O_3$ phase. This powder was passed through a fluid energy mill at a setting of about 80 psi of air pressure and was subsequently tumbled in a plastic jar for 30 minutes to ensure that the powder was fully homogenized.

Green compact disks of 1 gram of this powder were formed by die pressing at 3,900 psi followed by room temperature isostatic pressing at 60,000 psi. These green (as in unsintered, rather than as in color) compacts had dimensions of 1.40 centimeter in diameter by 0.18 centimeter thick and had a relative density of about 51% of the theoretical density (7.095 g/cm³). These green compacts were placed on $Gd_2O_3$ grit in an alumina tray and heated at ~250° C./hour in flowing oxygen (~2 SCFPH flow rate) in a platinum wound, electrical resistance furnace. The samples were sintered at 1,450° C. for three hours after which they had densified to a relative density of 95.7% measured by the Archimedes method. X-ray diffraction analysis of these green-colored samples showed a single phase garnet solid solution having a cubic structure and a measured lattice parameter of 12.387 Å. Based on the known $Gd_2O_3$-$Ga_2O_3$ phase diagram and the known correlation of lattice parameter of the GGG phase with $Gd_2O_3$ concentration as set forth in the article entitled, "$Sm_2O_3$-$Ga_2O_3$ and $Gd_2O_3$-$Ga_2O_3$ Phase Diagrams", by J. Nicolas et al. which appeared in the "Journal of Solid State Chemistry" Vol. 52 pages 101–113 (1984), our samples are indeed single phase with $Gd_2O_3$ concentration of 0.381 mole fraction. The sintered disks were immersed in $Gd_2O_3$ packing powder in a molybdenum crucible after which the loaded crucible was inserted in a HIP furnace and heated at a rate of 25° C./minute up to 1,450° C. in 11,000 psi of argon pressure. After a soak time of one-half hour at 1,400° C., the furnace and the samples therein were cooled to room temperature.

Figure 3:
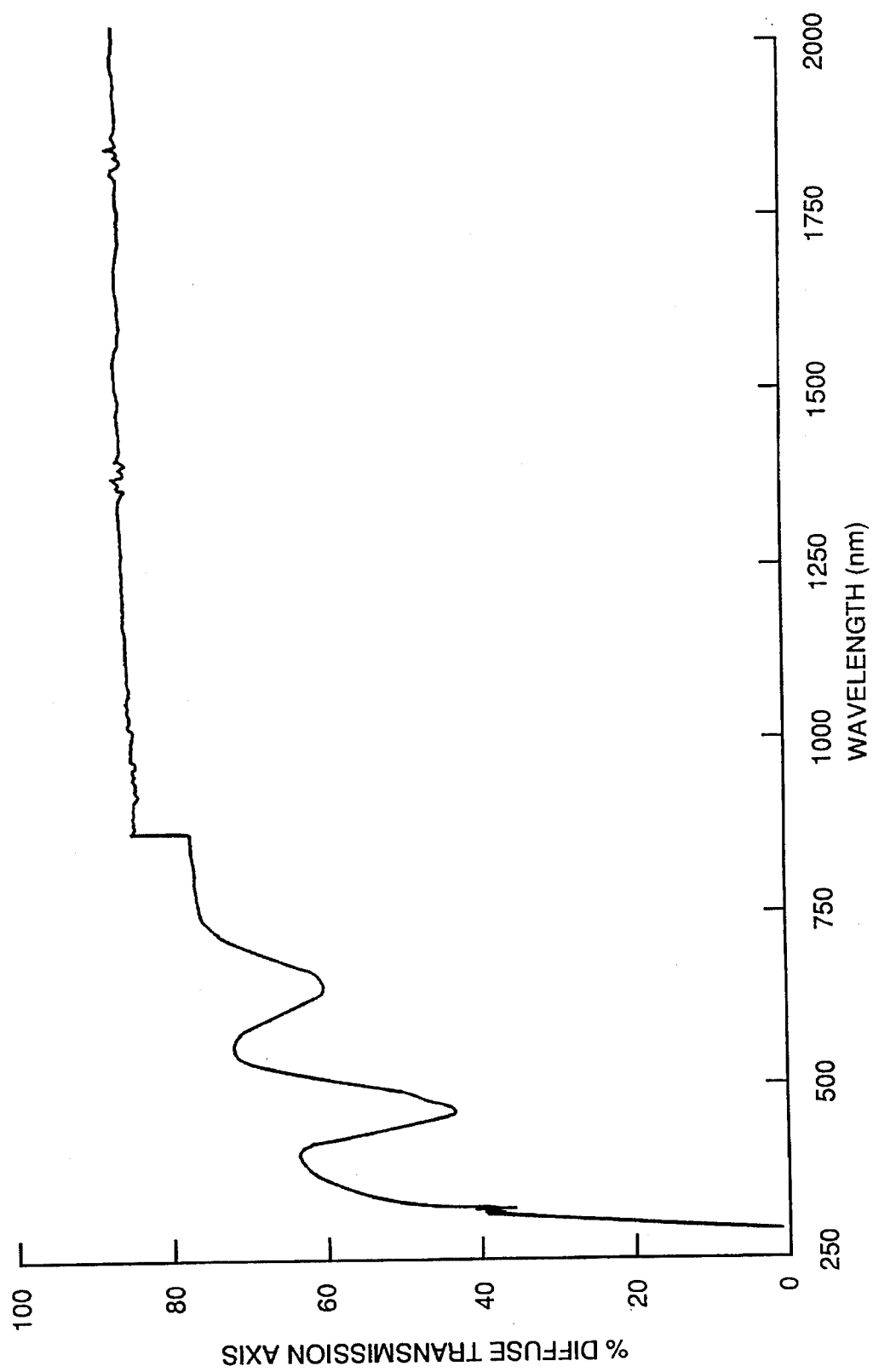
FIG. 3 presents spectral transmission curves.

These sintered plus HIP disks were ground and polished for measurement of spectral transmission as a function of wavelength from visible to the infrared region. These samples were highly transparent in the visible region and characterized by a typical spectral transmission curve which is shown in FIG. 3. In FIG. 3, the curve is for a transparent ceramic GGG disk made by this ammonium oxalate process that contains 0.002 mole fraction (or 0.12 weight %) of $Cr_2O_3$ in solid solution.

Figure 4:
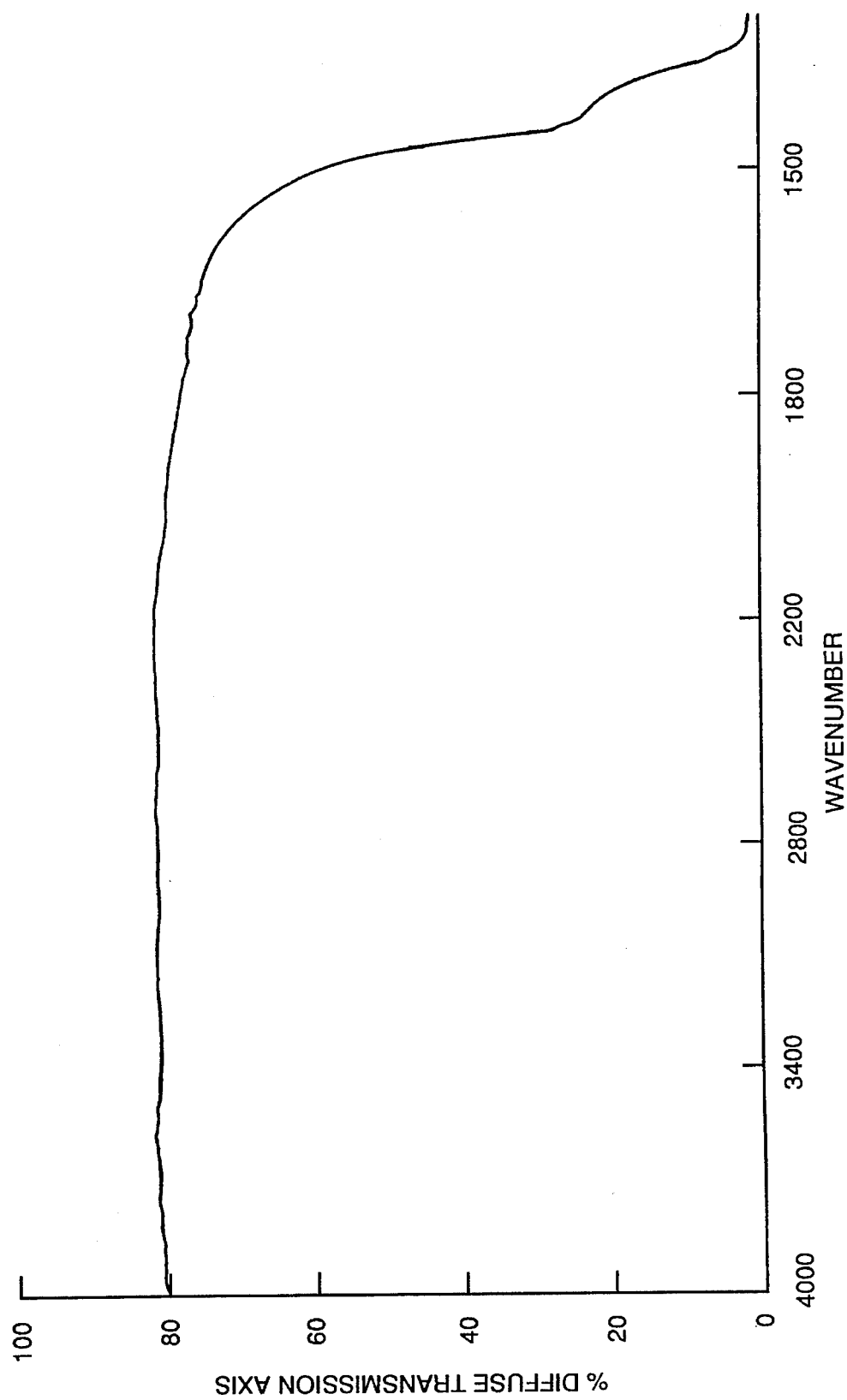
FIG. 4 illustrates the infrared transmission curves for the disk used in FIG. 3.

FIG. 4 shows the infrared transmission curve for the same ceramic garnet disk whose transmittance in the visible region is shown in FIG. 3. The high transmission of $\geq 80\%$ from 4,000 to 2,000 wave number is near the expected theoretical limit of about 82%.

Figure 5A:
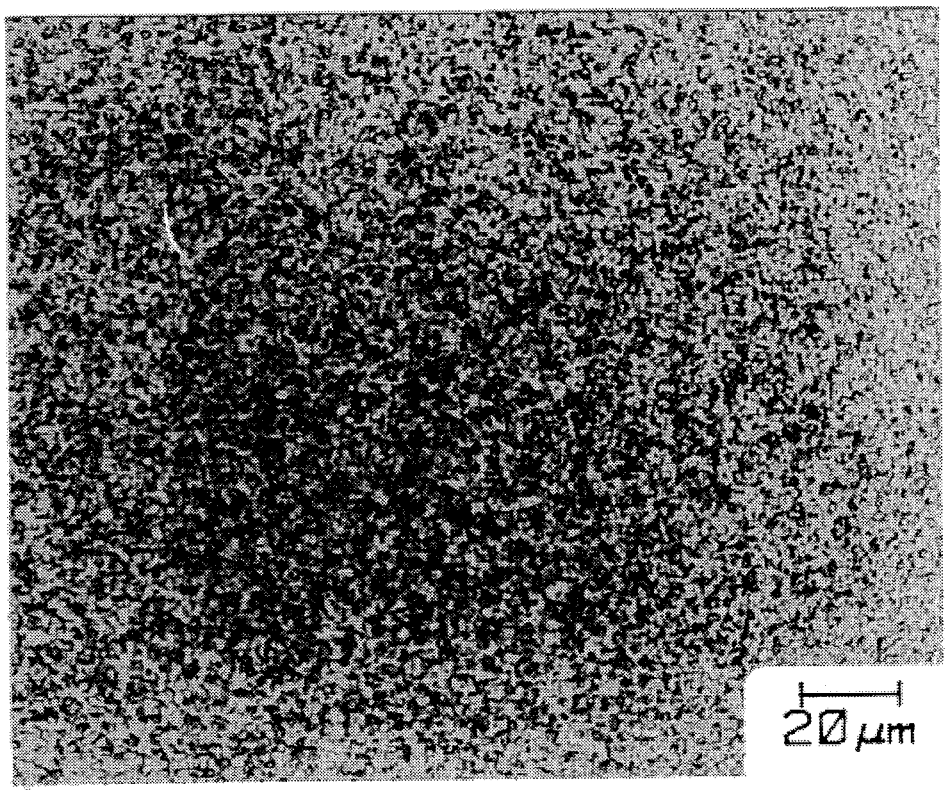
FIGS. 5A and 5B are photomicrographs of a ceramic garnet in accordance with this invention.
Figure 5B:
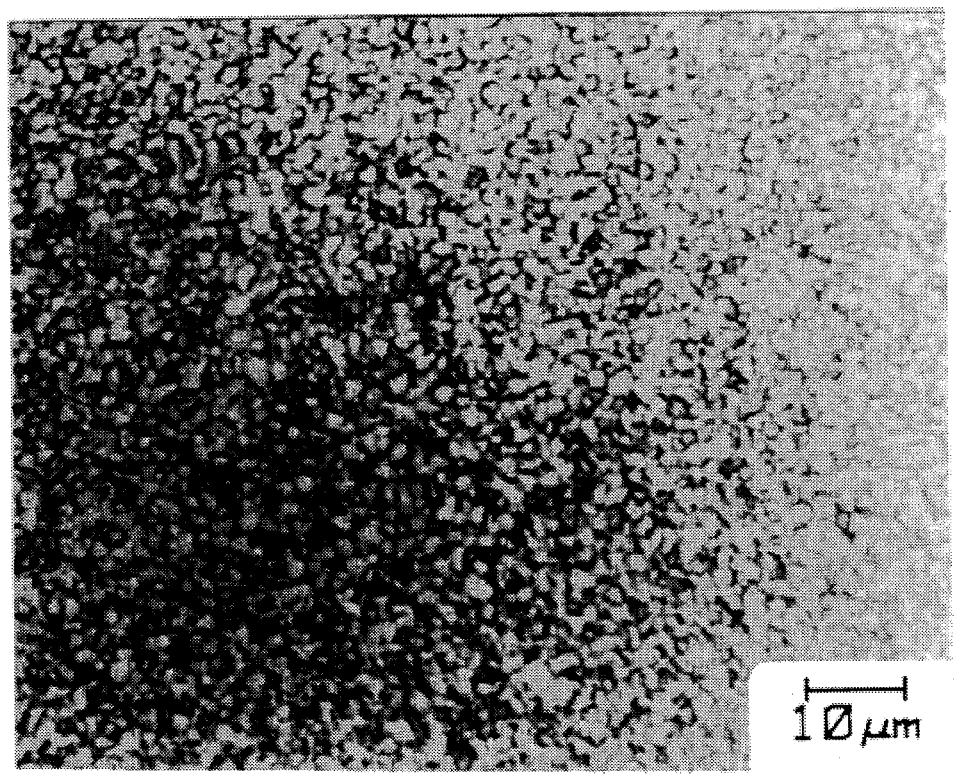

The microstructure of the transparent sintered plus HIP sample was revealed by sectioning, polishing and chemical etching with hot HCl. FIGS. 5A and 5B are photomicrographs at different magnifications of the microstructure showing the fine polycrystalline grain structure with an average grain size of about 2.5 microns.

EXAMPLE 2

A batch size containing twice the amount of materials used in Example 1 was prepared with the same initial composition, $Gd_3Ga_{4.984}Cr_{0.016}O_{12}$. The preparation of the reactants, the precipitation of the powder, the powder drying step and the thermal decomposition of the powder to form the garnet oxide phase were all essentially the same as those which have been described in Example 1. However, the powder milling process was different. 30 grams of the GGG:Cr oxide was added with 46 cc of methyl alcohol to a 250 ml plastic jar containing 466 grams of zirconia balls of density 5.6 g/cm². The powder was ball-milled for 24 hours, dried for 16 hours at 60° C. in flowing air and screened through a 60 mesh nylon screen.

A green compact weighing 10 grams was formed in a 2"×1" steel die by pressing at 4,000 psi followed by room temperature isostatic pressing at 60,000 psi. The resulting compact had a green (unsintered) density of 56% of theoretical density. This compact was sintered at 1,525° C. for two hours in oxygen gas and developed a relative density of 98.1%. This sintered plate was loaded into a molybdenum crucible and hot isostatic pressed in argon gas in identical fashion as previously described in Example 1. The resulting ceramic plate was characterized once the thin surface coating and roughness were polished off the sample. X-ray diffraction analysis of this sintered plus HIP ceramic garnet showed that the sample was cubic polycrystalline and single phase garnet with a lattice parameter of 12.390 Å, corresponding to a chemical composition of 0.382 mole fraction $Gd_2O_3$, 0.616 mole fraction $Ga_2O_3$ and 0.002 mole fraction (0.12 wt. %) $Cr_2O_3$ (assuming no $Cr_2O_3$ loss during preparation). This ceramic garnet plate was transparent and had a dark green color. The dark green color was presumably due not only to the $Cr^{3+}$ ions in the garnet lattice, but also to some impurity contamination from the zirconia grinding media used during the wet milling step. Consequently, the garnet plate was annealed at 1,450° C. for 10 hours in argon gas containing 0.4% oxygen to develop a desirable light green color. It was then mechanically finished with 400 grit aluminum paste to a thickness of 1 mm for evaluation of its optical and x-ray scintillator properties.

Figure 6:
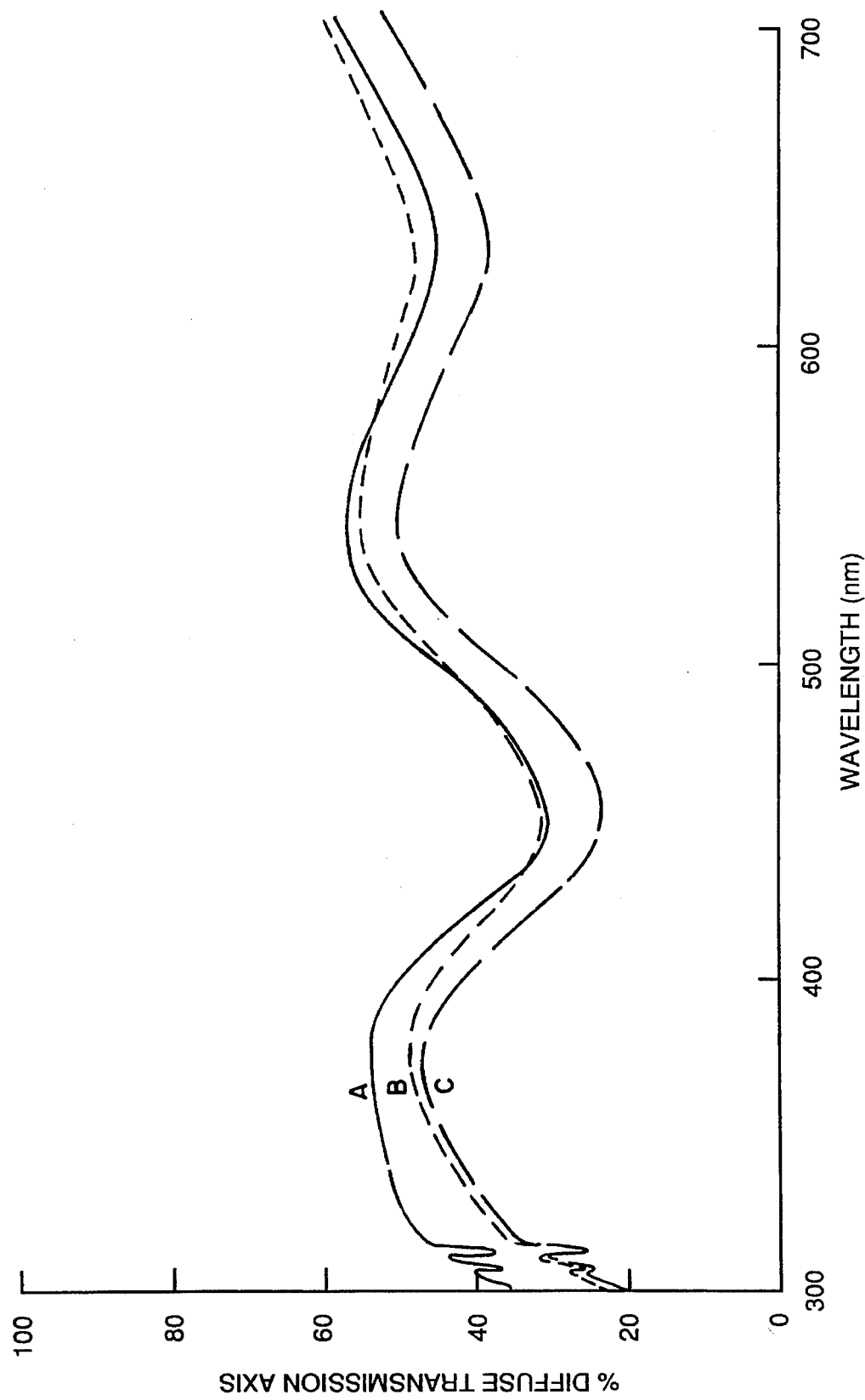
FIG. 6 compares diffuse transmittance of single crystalline and ceramic materials.

FIG. 6 compares the diffuse transmittance versus wavelength for the ceramic garnet plate made by this ammonium oxalate process (curve B) against a single crystalline garnet plate (curve A) of the same surface finish and thickness, but of a higher chromium concentration of 0.2 wt. % $Cr_2O_3$. The curve C represents a polycrystalline disk made by the ammonium hydroxide process which is discussed subsequently. Both the polycrystalline ceramic and the single crystalline garnet disks of thicknesses of about 1.3 mm exhibited the same characteristic absorption peaks centered at about 302, 307, 312, 450 and 625 nm. The sharp absorption peaks at 302, 307 and 312 nm are characteristic of the $Gd^{3+}$ ions whereas the other two broad absorption peaks centered at 450 and 625 nm are caused by the $Cr^{3+}$ ions in the octahedral environment of the GGG lattice. The ceramic garnet plate, having the optical quality shown in FIG. 6, curve B was examined for light output when exposed to x-rays generated from an x-ray tube operating at 60 kilovolts and 50 milliamps. A cadmium tungstate plate of similar dimensions was measured as a reference scintillator. This sample's luminescent light output as a result of scintillation, was measured by a PIN photodiode detector. The light output of the transparent, ceramic garnet doped with 0.12 wt. % $Cr_2O_3$ was 1.8 times the output measured from the plate of single crystalline cadmium tungstate. The high scintillation efficiency under x-ray excitation makes this Cr-doped ceramic garnet useful as an x-ray scintillator.

EXAMPLE 3

A green compact was prepared from the same milled garnet powder which was produced in Example 2. One gram of this powder was die pressed in a 0.625" diameter die and then isostatically pressed at 60,000 psi. This disk-shaped sample was sintered at 1,550° C. for four hours in pure oxygen in a platinum-wound electrical resistance furnace. This sintered disk was light green in color and was ground and polished to a thickness of 1 mm to reveal its transparency. The unaided eye could resolve distant objects through the polished disk when the disk was placed in front of the eye. This confirmed that the disk was truly transparent since the ability to resolve a distant object through a disk is a much more stringent test of uniformity and transparency than is resolving an image in direct contact with a disk, such as printing on a sheet of paper on which the disk is placed.

The luminescent light output of this disk was measured under the same dose of x-ray excitation as described in Example 2 and compared to the output of a typical cadmium tungstate scintillator. The light output of this sintered, transparent Cr doped garnet was a factor of 1.7 times higher than that measured for a cadmium tungstate scintillator.

An Alternative Process

As an alternative process for preparing garnets in accordance with the present invention, a chloride source solution of the cations is prepared in a similar manner to that used in the ammonium oxalate process. However, in this process, ammonium hydroxide is slowly added to the chloride solution to produce the precipitate. The precipitate is then processed in a similar manner to that used for precipitate prepared by the ammonium oxalate process.

EXAMPLE 4

The process of this example was repeated many times using slightly different quantities of the starting materials and a range of processing conditions as indicated herein. 12.50 g of $Ga_2O_3$ was placed in a 400 ml beaker with 50 cc of deionized water. 101.3 cc of 37% HCl was added to this slurry while stirring the slurry on a heated hot plate. 14.55 g of $Gd_2O_3$ was sprinkled into the vortex of the stirring $HCl/Ga_2O_3$ mixture. The sides of the beaker were washed with deionized water, the beaker was covered and its contents was brought to a boil. The boiling was continued until the solution cleared, which took about an hour and one half. The heater was then turned off and 0.153 g $CrCl_3 \cdot 6H_2O$ was added.

The solution was then cooled to room temperature and transferred to a 1 liter beaker. 86.0 cc of 30% $NH_4OH$ was diluted with an equal volume of deionized water. This diluted $NH_4OH$ was then added drop-wise to the clear chloride solution while stirring vigorously. During this process the pH of the solution was monitored. The ammonium hydroxide solution was added until the pH was in the range from 7.8 to 8.3. Once the pH was in that range, precipitation was complete.

This solution was then vacuum filtered to separate the precipitate using medium filter paper. When most of the liquid was gone, but before the liquid level reached the precipitate, 500 cc of methanol were added to wash the precipitate. This addition of 500 cc of methanol was repeated when the liquid again almost reached the level of the precipitate. The filtering was then allowed to proceed until "all" of the liquid had been removed.

The resulting wet precipitate was dried for 12 hours at 50° C. under vacuum.

This dried precipitate was then heated in air and held at 900° C. for one hour to thermally decompose the hydroxide of the precipitate. The resulting garnet powder was then milled to reduce agglomeration and die pressed at pressures between 3,000 and 10,000 psi followed by isostatic pressing at room temperature to 60,000 psi. The resulting compact was sintered in an oxygen atmosphere at a temperature ranging from 1,400° C. to 1,600° C.

Sintered bodies prepared in this way range from translucent to transparent with greater transparency being obtained for those samples made from powder which was milled more extensively and for higher sintering temperatures.

Using this process, compositions have been prepared across the entire gadolinium gallium garnet single phase range from 0.625 mole fraction $Ga_2O_3$ and 0.375 mole fraction $Gd_2O_3$ to 0.554 mole fraction $Ga_2O_3$ and 0.442 mole fraction $Gd_2O_3$. The lattice parameter for the resulting cubic garnet crystal ranges from 12.375 Å (the Ga-rich edge of the single phase field) to 12.420 Å (the Gd-rich edge of the single phase field).

As an alternative to milling the powder after thermal decomposition, it may be milled prior to thermal decomposition.

When the dried precipitate was examined by x-ray diffraction, no diffraction peaks indicating crystalline properties were found. Consequently, the hydroxide precipitate is amorphous. Following thermal decomposition, x-ray diffraction analysis shows the typical diffraction pattern for garnets which has been discussed above in connection with the oxalate process.

Thus, the precipitate obtained by the oxalate and hydroxide processes has substantially different characteristics. In particular, the oxalate process produces a crystalline precipitate, whereas the hydroxide process produces an amorphous precipitate. Thus, where particularly fine powder size is desirable, the hydroxide process may be considered preferable to the oxalate process.

In each of our processes for producing a gallium containing garnet, we perform the precipitation of the multi-component precursor material under neutral or basic conditions in order to minimize the loss of gallium. In general, gallium compounds, aluminum compounds and chromium compounds do not precipitate well in an acid medium with the result that it is difficult or impossible to obtain the desired concentration of gallium in the precipitate when the precipitate is formed or washed under acid conditions. In this manner, our present process is significantly different than the preferred processes in the above-identified patents relating to the preparation of yttria-gadolinia oxide polycrystalline ceramic transparent bodies.

However, even with the use of basic conditions, some gallium is lost in the oxalate process. Consequently, our chloride source solution is intentionally made gallium rich in the oxalate process to precompensate for gallium loss during the precipitation and washing part of the process. The hydroxide process does not lose gallium.

In addition to the GGG materials which have been specifically described in the preceding examples, other transparent garnets may prepared by this process. Transparent lutetium and ytterbium gallium garnets should be particularly useful in x-ray applications because of their high x-ray stopping power.

In the examples described thus far, only a single dopant was added to the basic garnet composition. However, each of these materials may be prepared with multiple dopants, activators or low percentages of other 3+ cations which exhibit similar chemistry and thus may be co-precipitated with the cations of the basic garnet material. We have added $HfO_2$ and MgO as possible densification aids with an apparent improvement in transparency and without apparent adverse effects on scintillator properties.

It is clear from the comparison of the spectral response of these transparent polycrystalline garnet materials with the spectral response of similar single crystalline garnet materials that single crystalline and polycrystalline garnet materials of this composition are substantially equivalent for x-ray scintillator use. Polycrystalline ceramic garnets in accordance with this invention, are particularly useful for x-ray scintillator applications in which it is desired to dope the host material with one or more activators or other additives in order to control, adjust or modify particular characteristics of the scintillator material such as primary decay time, afterglow, radiation damage, hysteresis and so forth. This is because this co-precipitation process enables the preparation of transparent bodies having uniform, controlled concentrations of additives distributed in the basic crystal structure merely by adding appropriate quantities of the additive cations to the initial chloride solution. As has been indicated above, the relative quantities of the different cations which are appropriate may be different than the relative quantities of the cations in the desired final composition, in accordance with whether the concentration of a particular cation tends to be decreased during the precipitation and washing part of our process.

A specific example of the a basic composition which is desirably modified by the addition of more than one additive is gadolinium gallium garnet activated with chromium in which cerium is included as an afterglow reducer. Compositions having a chromium concentration of between 0.05 wt. % and 0.6 wt. % and from less than 0.013 wt. % to 0.10 wt. % cerium have been prepared in non-transparent form (by omitting the milling and hot isostatic pressing steps from this process) to determine their scintillator properties and exhibit excellent scintillator properties. A sample having the composition 53.69 wt. % $Gd_2O_3$+0.051 wt. % Ce+45.94 wt. % $Ga_2O_3$+0.31 wt. % $Cr_2O_3$ was then prepared using this full process, including milling and hot isostatic pressing. That sample was transparent and exhibited scintillator properties which were within measurement accuracy of those for the same composition prepared as a non-transparent sample. This is set forth in greater detail in the related application Ser. No. 07/546,824, now abandoned, entitled, "Hole-Trap-Compensated Scintillator Material".

While a chloride cation-source solution and an ammonium precipitate-inducing solution process has been described, it will be understood that other source-solutions/precipitate-inducing-solution combinations may be used to produce the precursor precipitate having the desired substantially uniform multi-component composition at the initial stages of the process.

While dry powder pressing has been used to form our green compacts, wet slip casting or pressure filtration of liquid suspended particles may also be used.

This process, and the resulting polycrystalline transparent ceramic garnet bodies have much wider utility than just as a luminescent x-ray scintillator material. In particular, chromium doped GGG may be a useful material for the active element of lasers. A particular advantage of the polycrystalline transparent bodies of this invention for use in lasers is the ability to add other dopants besides chromium to the host garnet material in controlled amounts as may be desirable to adjust particular properties. Those skilled in the various arts where such transparent polycrystalline ceramic garnet bodies will have utility, will recognize the suitability of these transparent bodies for use in these arts.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A transparent polycrystalline body in non-powdered form comprising:

between 0.554 and 0.625 mole fraction gallium oxide;

between 0.375 and 0.442 mole fraction gadolinium oxide;

between 0.001 and 0.004 mole fraction of chromium oxide wherein the chromium is present in a 3+ oxidation state;

said body having a density of at least 99.9% of theoretical density; and the individual grains of said polycrystalline body having cubic garnet crystal structures.

2. A transparent polycrystalline body in non-powdered form comprising individual single crystalline grains, each of said grains having:

a cubic garnet crystal structure, and a chemical composition $A_xB_{y-z}C_zO_{12}$; where $3 \leq x \leq 3.536$, $4.344 \leq y \leq 5$, $0.008 \leq z \leq 0.120$, A is gadolinium, B is gallium, and C is chromium ions in a 3+ oxidation state; and said body having a density of at least 99.9% of theoretical density.

3. A transparent polycrystalline body in non-powdered form in which:

the individual single crystalline grains comprising said polycrystalline body have:

cubic garnet crystal structures, and a chemical composition $A_xB_{y-z}C_zO_{12}$; where $3 \leq x \leq 3.536$ $4.344 \leq y \leq 5$, $0.008 \leq z \leq 0.120$, A is a rare earth or yttrium cation in a 3+ oxidation state or mixture thereof and may contain an effective activating amount of Ce or Nd in a 3+ oxidation state;

B is a gallium, aluminum or rare earth cation in a 3+ oxidation state; and

C is a Cr activator cation in the 3+ oxidation state; and said body has a density of at least 99.9% of theoretical density.

* * * * *